(No Model.)

C. H. HOLDREDGE.
VEHICLE GEAR.

No. 483,381. Patented Sept. 27, 1892.

Witnesses
Alonzo M. Luther.
Allen Tenny.

Inventor
Charles H. Holdredge.
By his Attorney
Frank H. Allen.

UNITED STATES PATENT OFFICE.

CHARLES H. HOLDREDGE, OF WESTERLY, RHODE ISLAND.

VEHICLE-GEAR.

SPECIFICATION forming part of Letters Patent No. 483,381, dated September 27, 1892.

Application filed February 1, 1892. Serial No. 419,902. (No model.)

*To all whom it may concern:*

Be it knows that I, CHARLES H. HOLDREDGE, a citizen of the United States, residing at Westerly, in the county of Washington and State of Rhode Island, have invented certain new and useful Improvements in Vehicle-Gears, which improvements are fully set forth and described in the following specification, reference being also made to the accompanying sheet of drawings.

My invention is in so-called "side-spring" vehicle-gears, and has for its object the production of a gear of simple construction which shall be more "springy" than those now in common use.

My newly-improved gear also provides a form of side spring which effectually avoids the danger of breaking which exists in certain springs now used.

Figure 1:
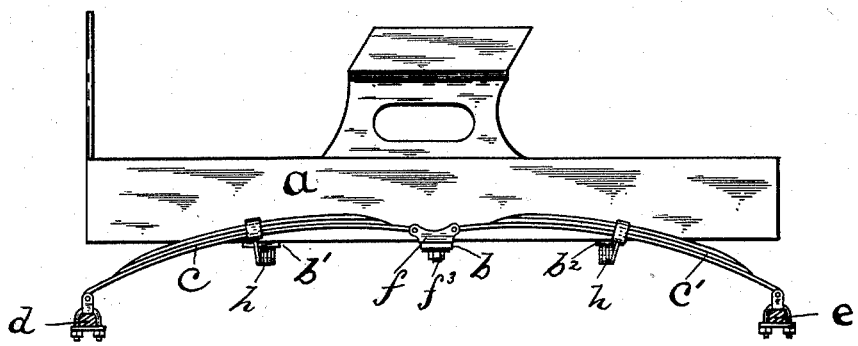
Figure 2:
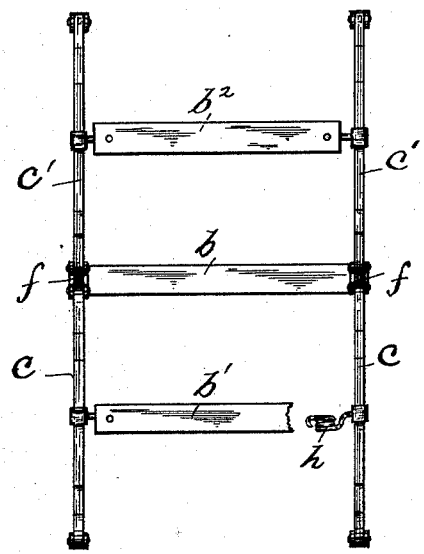
Figure 3:
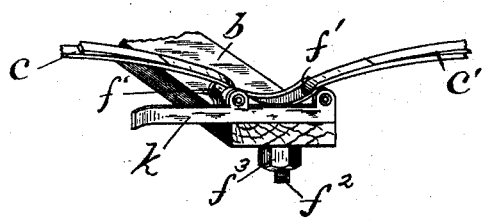
Figure 4:
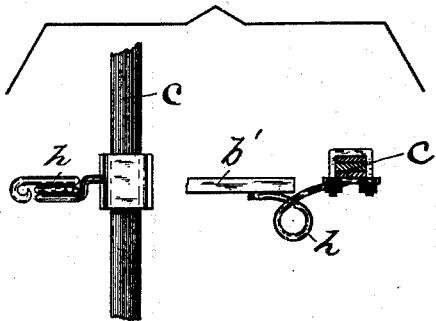

The annexed drawings illustrate my invention, Figure 1 being a side elevation of a wagon-body having connected therewith such portions of a gear as relate to my improvements, and Fig. 2 is a plan view of said portions, the body being removed. Fig. 3 is an enlarged perspective view of the connection by means of which the meeting ends of the side springs are connected to each other and to the middle cross-bar. Fig. 4 shows enlarged top and side views of the coiled springs $h$.

In the drawings the letter $a$ denotes the body of the vehicle, supported by and upon three cross-bars $b$ $b'$ $b^2$, to which the said body is rigidly secured by screws or bolts. Springs $c$ $c'$ are provided at each side of the body. These springs are in longitudinal alignment with each other, the front end of the spring $c$ being clipped to an ordinary rocker-bar $d$ and the rear end of the companion spring $c'$ is clipped directly to the rear axle $e$. The confronting ends of said springs (on each side of the body) are secured to a strong connection $f$, of metal, having upturned perforated lugs $f'$, substantially like those of a thill-shackle, between which lugs the ends of the springs are bolted. Projecting downward from the spring connection thus provided is a threaded bolt or pintle $f^2$, which extends through the end of cross-bar $b$, already referred to. When the parts are assembled, a nut $f^3$ is screwed onto said threaded bolt, thus practically hinging the meeting ends of the side springs together and clamping them to the cross-bar and body. This construction in comparison with the single long side spring heretofore commonly used provides greater elasticity and avoids the tendency to break which exists in said single springs, which as a rule are drilled with one or more holes to receive clamping-bolts. Each of the springs $c$ $c'$ is formed with two or more leaves, according to the elasticity desired or load to be carried by the vehicle.

About midway of the length of each spring $c$ $c'$—that is to say, at a point opposite the ends of the cross-bars $b'$ $b^2$—I provide a clamp or clip, which encircles the spring, and to the lower side of said clamp I secure one end of a spring $h$, here illustrated as a spiral spring. The other end of spring $h$ is secured to the under side of cross-bar $b'$ or $b^2$, as the case may be.

While I have shown a simple spiral or coil spring $h$, I do not wish to confine my invention to the use of springs of exactly such form, as various forms could be successfully substituted therefor. These springs $h$ are practically the fulcra of the springs $c$ $c'$ and serve to prevent the hinged inner ends of said springs $c$ $c'$ from being too easily depressed when a load is carried by the vehicle. When a light load only is carried, the side springs are depressed but a little distance, and consequently the fulcrum-springs $h$ are hardly brought into use, they serving rather as stops to check and limit the downward movement of the body; but when a heavier load is carried by the vehicle the fulcrum-springs begin to yield, their resistance being proportionate to the weight of the load. This construction provides an easy and uniformly-elastic movement of the body whatever may be the weight of the load carried.

In Fig. 3 I have shown a "rub-iron" $k$, having perforated lugs corresponding in size and position with the lugs $f'$ of the described spring connection and held in place by the same bolts that support the confronting ends of the side springs.

The spring connection $f$ could, if desired, be made in form of a clip adapted to surround the end of the cross-bar $b$ instead of being formed with a single threaded bolt, as here shown.

Having described my invention, I claim—

In combination with the body and gears of a vehicle, a pair of springs at each side of the body, each pair having the meeting ends of the springs jointedly secured to the body, and a coil-spring secured at one end to each of the vehicle-springs and having the opposite end secured to the body of the vehicle, substantially as set forth.

CHARLES H. HOLDREDGE.

Witnesses:
E. A. STILLMAN,
C. B. BLIREN.